June 13, 1961

S. L. THOMAS 2,988,110

FAUCET

Filed Oct. 19, 1959

INVENTOR.
STANLEY L. THOMAS

BY

ATTORNEYS

June 13, 1961 S. L. THOMAS 2,988,110
FAUCET
Filed Oct. 19, 1959
2 Sheets-Sheet 2

INVENTOR.
STANLEY L. THOMAS
BY
Donnelly, Mentag & Harrington
ATTORNEYS

United States Patent Office 2,988,110
Patented June 13, 1961

2,988,110
FAUCET
Stanley L. Thomas, 1911 Fern Ave., Royal Oak, Mich.
Filed Oct. 19, 1959, Ser. No. 847,137
7 Claims. (Cl. 137—636.4)

My invention relates to a new and useful improvement in a faucet and particularly of that type which serves as a control for mixing hot and cold water, and which is self closing after being opened a period of time. The invention, therefore, embodies a structure in which mixing the hot and cold water may be effected, and in which the length of time that the faucet is opened can be controlled.

It is an object of the present invention to provide a faucet of this class which would be simple of structure, economical of manufacture, durable, compact, easily operated and highly efficient in use.

Another object of the invention is the provision of a faucet to move to open position against the compression of a spring and so arranged and constructed that the flowing water will retard the movement of the valve to closed position in response to spring pressure.

Another object of the invention is the provision in a faucet of this class whereby an adjustment is afforded for regulating the retarding influence of the flowing water.

Another object of the invention is the provision of a simple and effective means for regulating the control of the flow of hot water and cold water.

Other objects will appear hereinafter.

It is recognized that various modifications and changes may be made in the detail of the structure illustrated without departing from the invention and it is intended that the present disclosure shall be considered to be but the preferred embodiment.

Forming a part of this application are drawings in which:

FIG. 3 is a sectional view taken on line 3—3 of FIG. 1;

FIG. 4 is a central, sectional view through the valve mechanism;

Figure 1:
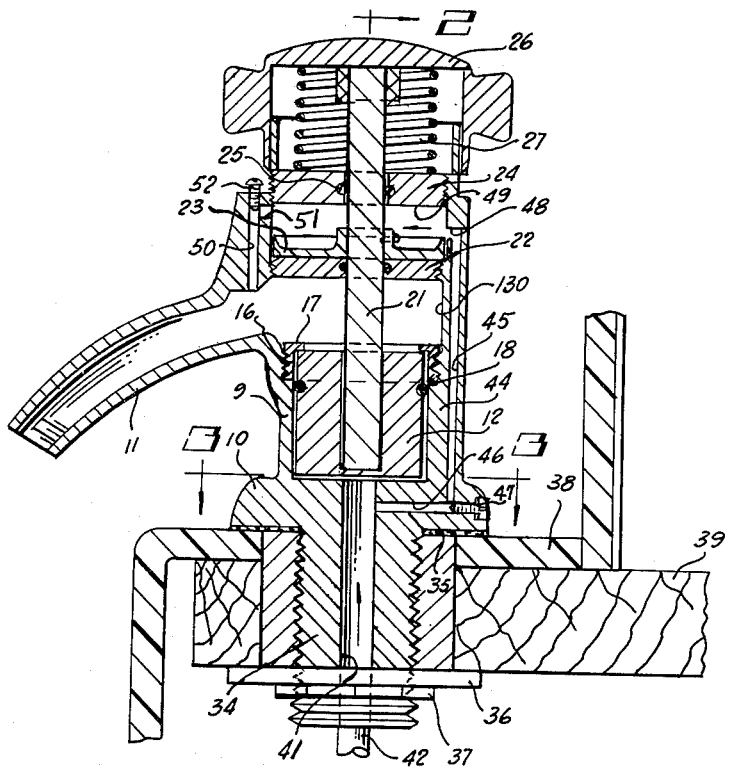
FIG. 1 is a central, vertical, sectional view of the invention.

As shown on the drawings, the invention comprises a housing 9 having a base 10 and provided with an outlet spout 11. Positioned within the housing 9 is a valve body or mechanism 12 having at the bottom thereof a cup-shaped structure 13 for reception of the valve head or plug 13a connected by the stem 13b to the stem 21. Leading into the structure 12, from the bottom thereof, are inlet ports 14 and 15.

Threaded into the housing 9, is a retainer 16 having a flange 17 which overlies the valve structure 12 and engages the upper face thereof. The valve structure 12 is sealed against leakage around its periphery by means of the sealing ring 18. Formed centrally in the valve structure 12 is a sleeve 19 from which projects the valve stem 21 which is sealed by the sealing ring 20 so that no liquid can escape around the valve stem 21 through the member 19.

Mounted in the housing 9 above the location of the spout 11 is a first closure plate 22 which is stationary relative to the housing 9. Connected to the valve stem 21 is a disk 23 which, when the valve is open, as shown in FIG. 1, rests above the upper face of the plate 22. Threaded into the upper end of housing 9 is a second closure plate 24 provided with a sealing ring 25 which surrounds the valve stem 21 which slidably projects therethrough. A cap 26 is fixedly mounted on the upper end of the valve stem and telescopes with the upper end of the housing 9. As shown in FIG. 4, the inlet openings or ports 14 and 15 are separated by a partition 28 from the outlet openings 29 and 30. The space between the plate 22 and the upper end of the valve mechanism 12 may be termed a mixing chamber 130. When the valve plunger 13a is moved into the position shown in FIG. 4, the openings 14 and 15 will be in communication with the outlet openings 29 and 30 through the slots 131. When the valve is in closed position, that is, when stem 21 moves upwardly in response to the pressure of the spring 27, the plunger 13a will close the passage through the partition 28 so that communication of the openings 14 and 15 with the outlet openings or ports 29 and 30 will be closed. When open, the water will flow into the mixing chamber 130 and flow outwardly from the spout 11.

Figure 6:
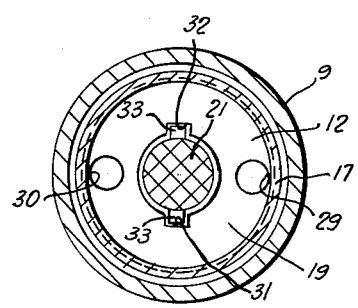
FIG. 6 is an enlarged sectional view taken on line 6—6 of FIG. 2.

As shown in FIG. 6, the valve stem 21 has oppositely disposed ribs 33 which engage in the oppositely disposed slots 31 and 32 formed in the valve construction 12. The arrangement is that upon rotating the member 26, the valve stem 21 will be rotated so as to rotate the valve construction 12.

Formed integrally with and projecting downwardly from the base 10 is a stem 34 which is threaded on its periphery. A rubber washer 35 is positioned between the base 10 and the upper part of the sink 38 which rests upon the support 39. This stem 34 projects through the openings formed in the sink 38 and the support 39. Embracing the stem 34 is a washer 36 which engages the under-surface of the support 39 and is held in clamping relation thereto by means of the nut 37 threaded on the stem 34.

Figure 5:
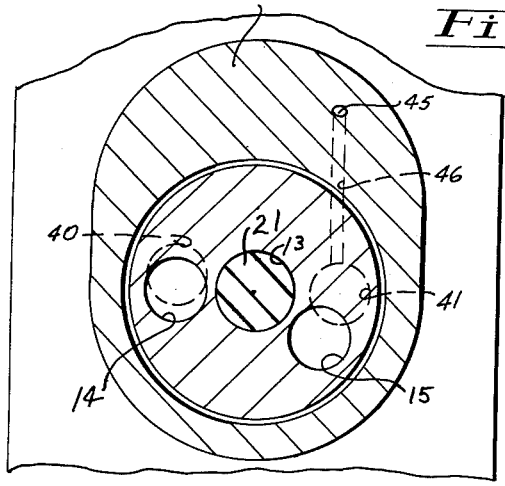
FIG. 5 is an enlarged sectional view taken on line 5—5 of FIG. 2.

Formed through the stem 34 and the base 10 are the inlet passages 40 and 41 which are connected to the inlet pipes 42 and 43. As shown in FIG. 5 and in FIG. 1, the wall of the housing 9 is bulged outwardly as at 44 to provide greater thickness. Formed in the outwardly bulged portion 44 is a vertically directed retardation inlet passage 45 shown in FIG. 1. This retardation inlet passage 45 connects through the lateral retardation inlet passage 46 with the inlet passage 41. At the upper end, the retardation inlet passage 45 communicates through the lateral retardation inlet passage 48 with a retardation chamber 49 which is positioned between the closure plate 22 and the closure plate 24 to provide a chamber 49. This retardation chamber 49 communicates through the retardation inlet passage 50 with the outlet passage 51 and the communication is controlled by means of the stay screw or needle valve 52. The communication of the passage 45 and 46 is also controlled by the needle valve 47.

Figure 2:
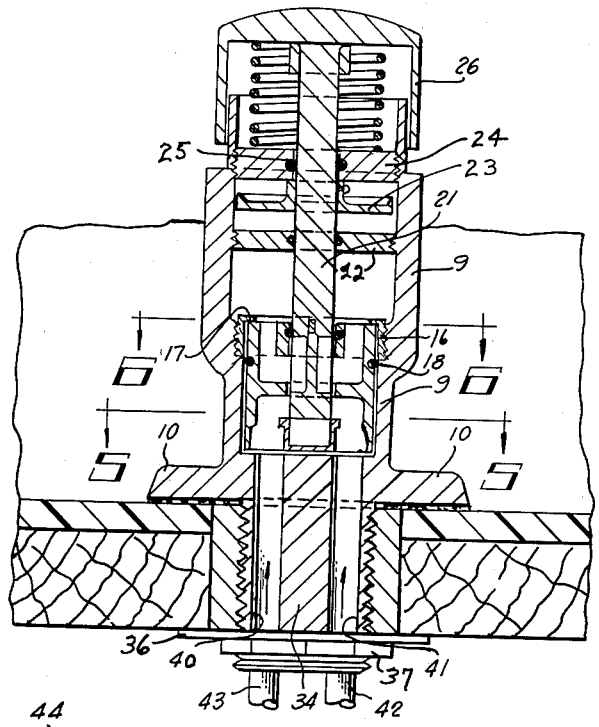
FIG. 2 is a sectional view taken on line 2—2 of FIG. 1.

In operation, the user would press the cap 26 downwardly which would move the valve out of the closed position shown in FIG. 2, to the open position shown in FIG. 4. This would permit water to flow upwardly through the inlet passages 41 and 40 into the mixing chamber 130. At the same time, water would flow through the retardation inlet passages 45 and 46 into the retardation chamber 49 above the disk 23. By rotating the member 26, the valve mechanism 12 would be rotated so as to move the inlet ports 14 and 15 into and out of retardation with the inlet passages 41 and 40. In this manner, the amount of hot and cold water may be regulated. When the water is regulated, the user will release the downward pressure on the member 26 and the spring 27 will move the valve into closed position. This movement, however, is retarded by the water which is flowing into the chamber 49. By adjusting the screws 47 and 52, the amount of retarding force of this water may be regulated. For instance, by opening the needle valve 52 completely and having the needle valve 47 partially closing the communication between the passages 46 and 45, the water will flow out of the chamber 49 as fast as it flows into it so that there would be practically no retarding effect. By adjusting these needle valves, the flow of the water into the chamber 49 may be regulated so that when the valve is pressed downwardly in open position, it will remain in open position a predetermined time. As the spring moves the member 23 upwardly, it will move into position to close the end of the passage 48 and then the spring can move the valve into final closing position.

Experience has shown that a valve constructed in this manner is one in which a timed flow of water may be obtained with a minimum of adjustment and the temperature of the water easily and quickly regulated.

What I claim is:

1. A faucet of the class described, comprising: a housing; an outlet spout projecting outwardly from said housing; a valve body rotatably mounted in said housing; means for retaining said valve body against longitudinal movement, said valve body having a pair of inlet ports at one end and a pair of outlet ports at the opposite end; a partition in said valve body for separating the pair of ports at one end from the pair of ports at the opposite end and having a central opening formed therein; a valve stem slidably projected through said opening in said partition; a valve head on the end of said stem, said stem being cut-away inwardly of said head; a guide sleeve on said valve body through which said valve stem projects, the movement of said valve stem upwardly, moving said valve head to close said opening through said partition and the movement of said valve stem in the opposite direction, moving said valve head out of closing position relatively to said partition and moving the cut-away portion of said valve stem to a position at opposite sides of said partition for establishing the communication of the inlet ports at one end of said body with the outlet ports of the other end of said body, said ports at one end of said body being non-communicating with each other.

2. A faucet of the class described, comprising: a housing; an outlet spout projecting outwardly from said housing; a valve body rotatably mounted in said housing; means for retaining said valve body against longitudinal movement, said valve body having a pair of inlet ports at one end and a pair of outlet ports at the opposite end; a partition in said valve body for separating the pair of ports at one end from the pair of ports at the opposite end and having a central opening formed therein; a valve stem slidably projected through said opening in said partition; a valve head on the end of said stem, said stem being cut-away inwardly of said head; a guide sleeve on said valve body through which said valve stem projects, the movement of said valve stem upwardly, moving said valve head to close said opening through said partition and the movement of said valve stem in the opposite direction, moving said valve head out of closing position relatively to said partition and moving the cut-away portion of said valve stem to a position at opposite sides of said partition for establishing the communication of the inlet ports at one end of said body with the outlet ports of the other end of said body, said ports at one end of said body being non-communicating with each other; and a spring associated with said valve stem for moving the same in one direction upon being compressed upon movement of said valve stem in the opposite direction.

3. A faucet of the class described, comprising: a housing; an outlet spout projecting outwardly from said housing; a valve body rotatably mounted in said housing; means for retaining said valve body against longitudinal movement, said valve body having a pair of inlet ports at one end and a pair of outlet ports at the opposite end; a partition in said valve body for separating the pair of ports at one end from the pair of ports at the opposite end and having a central opening formed therein; a valve stem slidably projected through said opening in said partition; a valve head on the end of said stem, said stem being cut-away inwardly of said head; a guide sleeve on said valve body through which said valve stem projects, the movement of said valve stem upwardly, moving said valve head to close said opening through said partition and the movement of said valve stem in the opposite direction, moving said valve head out of closing position relatively to said partition and moving the cut-away portion of said valve stem to a position at opposite sides of said partition for establishing the communication of the inlet ports at one end of said body with the outlet ports of the other end of said body, said ports at one end of said body being non-communicating with each other; a spring associated with said valve stem for moving the same in one direction upon being compressed upon movement of said valve stem in the opposite direction; and, a first closure plate mounted in said housing above said valve body to provide a mixing chamber, said valve stem projecting centrally through said mixing chamber.

4. A faucet of the class described, comprising: a housing; an outlet spout projecting outwardly from said housing; a valve body rotatably mounted in said housing; means for retaining said valve body against longitudinal movement, said valve body having a pair of inlet ports at one end and a pair of outlet ports at the opposite end; a partition in said valve body for separating the pair of ports at one end from the pair of ports at the opposite end and having a central opening formed therein; a valve stem slidably projected through said opening in said partition; a valve head on the end of said stem, said stem being cut-away inwardly of said head; a guide sleeve on said valve body through which said valve stem projects, the movement of said valve stem upwardly, moving said valve head to close said opening through said partition and the movement of said valve stem in the opposite direction, moving said valve head out of closing position relatively to said partition and moving the cut-away portion of said valve stem to a position at opposite sides of said partition for establishing the communication of the inlet ports at one end of said body with the outlet ports of the other end of said body, said ports at one end of said body being non-communicating with each other; a spring associated with said valve stem for moving the same in one direction upon being compressed upon movement of said valve stem in the opposite direction; a first closure plate mounted in said housing above said valve body to provide a mixing chamber, said valve stem projecting centrally through said first closure plate and said mixing chamber; a second closure plate mounted in the upper end of said housing in spaced relation to the first named closure plate to form a retardation chamber; a disk fixedly mounted on said valve stem and positioned within said housing in said retardation chamber between said closure plates; an extension on said housing having a pair of inlet passages formed therein, each communicating with one of the inlet ports of said valve body; a plurality of retardation inlet passages in said housing communicating one of said inlet passages with the retardation chamber between said closure plates; and, said disk in said retardation chamber normally closing communication of said retardation inlet passages with said retardation chamber between said closure plates and movable, upon downward movement of said valve stem, for opening said communication.

5. The invention as defined in claim 4, including: a needle valve for proportioning the communication of said passages with said one inlet passage.

6. The invention as defined in claim 4, including: means operable upon rotation of said valve stem for rotating said valve body and proportioning the amount of communication of said inlet ports of said body with said inlet passages in said extension on said housing.

7. The invention as defined in claim 5, including: said housing having a retardation outlet passage communicating with the retardation chamber between said disk and the upper closure plate; and, a second needle valve for proportioning the amount of communication of the retardation outlet passage with said retardation chamber.

References Cited in the file of this patent
UNITED STATES PATENTS

| 2,800,923 | Russell | July 30, 1957 |

FOREIGN PATENTS

| 419,004 | France | of 1910 |